US012804708B2

(12) United States Patent
Choi et al.

(10) Patent No.: US 12,804,708 B2
(45) Date of Patent: Nov. 17, 2026

(54) ELECTRONIC DEVICE FOR SEARCHING FOR WIRELESSLY CONNECTABLE EXTERNAL DEVICE, AND OPERATING METHOD THEREFOR

(71) Applicant: SAMSUNG ELECTRONICS CO., LTD., Suwon-si (KR)

(72) Inventors: Hyeonu Choi, Suwon-si (KR); Junsu Choi, Suwon-si (KR); Hyunkee Min, Suwon-si (KR); Sunkee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

(21) Appl. No.: 18/120,051

(22) Filed: Mar. 10, 2023

(65) Prior Publication Data

US 2023/0209592 A1 Jun. 29, 2023

Related U.S. Application Data

(63) Continuation of application No. PCT/KR2021/012413, filed on Sep. 13, 2021.

(30) Foreign Application Priority Data

Sep. 21, 2020 (KR) ........................ 10-2020-0121656

(51) Int. Cl.
*H04W 74/06* (2009.01)
*H04W 48/16* (2009.01)

(52) U.S. Cl.
CPC ........... *H04W 74/06* (2013.01); *H04W 48/16* (2013.01)

(58) Field of Classification Search
CPC ..... H04W 74/06; H04W 48/16; H04W 84/12; H04W 88/02; H04W 74/006;
(Continued)

(56) References Cited

U.S. PATENT DOCUMENTS 5,646,618 A * 7/1997 Walsh .................. H04N 19/176 375/E7.176
7,236,460 B2 * 6/2007 Wu ....................... H04W 12/08 370/241

(Continued)

FOREIGN PATENT DOCUMENTS

CN 110139263 9/2019
JP 2019-62330 4/2019

(Continued)

OTHER PUBLICATIONS

IEEE Std 802. 11ac-2013 (Amendment to IEEE Std 802.11-2012, as amended by IEEE Std 802.11ae-2012, IEEE Std 802.11aa-2012, and IEEE Std 802.11ad-2012) , vol. No., pp. 1-425, Dec. 18, 2013, doi: 10.1109/IEEESTD.2013.6687187. (Year: 2013).*

(Continued)

*Primary Examiner* — Rebecca E Song
*Assistant Examiner* — Cason H Morse
(74) *Attorney, Agent, or Firm* — NIXON & VANDERHYE P.C.

(57) ABSTRACT

According to various embodiments of the present disclosure, an electronic device comprises: a communication circuit, and a processor operably connected to the communication circuit, wherein the processor is configured to: receive signals for at least two channels during a designated search time, identify whether a frame is a designated frame based on information included in at least some of the signals, and store information about an access point (AP) based on the signal identified as the designated frame.

8 Claims, 13 Drawing Sheets

(58) Field of Classification Search
CPC ..... H04W 74/04; H04W 76/10; H04W 48/10; H04W 48/17; H04W 48/20; H04W 74/002; H04W 88/12; H04W 88/08; H04W 72/02; H04W 92/10; H04W 99/00; H04W 48/18; H04W 74/00; H04W 84/10; H04W 74/0891; H04W 74/0808; Y02D 30/70; H04L 5/003; H04L 5/0082; H04L 5/0078; H04L 25/0204
See application file for complete search history.

(56) References Cited

U.S. PATENT DOCUMENTS

| | | | | |
|---|---|---|---|---|
| 7,539,146 | B2 * | 5/2009 | Wu | H04W 12/08 370/241 |
| 8,300,613 | B2 * | 10/2012 | Zhu | H04W 48/16 455/425 |
| 8,750,261 | B2 * | 6/2014 | Li | H04L 5/0035 713/168 |
| 9,088,911 | B2 * | 7/2015 | Lee | H04W 24/10 |
| 9,198,120 | B2 * | 11/2015 | Liu | H04W 48/16 |
| 9,232,548 | B2 * | 1/2016 | Wang | H04W 76/11 |
| 9,521,696 | B2 | 12/2016 | Lee et al. | |
| 10,049,000 | B2 | 8/2018 | Thoukydides et al. | |
| 10,154,449 | B2 | 12/2018 | Kang et al. | |
| 10,645,607 | B2 | 5/2020 | Aboul-Magd et al. | |
| 11,089,638 | B2 | 8/2021 | Kim et al. | |
| 2003/0185244 | A1 | 10/2003 | Wu et al. | |
| 2004/0242248 | A1 * | 12/2004 | Goldberg | H04W 48/20 455/500 |
| 2005/0025080 | A1 * | 2/2005 | Liu | H04L 69/323 370/389 |
| 2013/0089039 | A1 * | 4/2013 | Vashi | H04W 72/02 370/329 |
| 2013/0286937 | A1 | 10/2013 | Liu et al. | |
| 2014/0010089 | A1 * | 1/2014 | Cai | H04W 48/16 370/241 |
| 2014/0079043 | A1 * | 3/2014 | Montemurro | H04W 52/0216 370/338 |
| 2014/0337690 | A1 * | 11/2014 | Zhang | H04L 1/003 714/776 |
| 2015/0181507 | A1 * | 6/2015 | Park | H04W 72/0446 370/336 |
| 2016/0157163 | A1 * | 6/2016 | Lee | H04W 56/00 370/338 |
| 2017/0223561 | A1 * | 8/2017 | Radulescu | H04W 56/00 |
| 2018/0035379 | A1 * | 2/2018 | Kim | H04W 52/0238 |
| 2018/0103430 | A1 * | 4/2018 | He | H04W 48/16 |
| 2018/0352499 | A1 * | 12/2018 | Khoury | H04W 48/08 |
| 2019/0098627 | A1 | 3/2019 | Tamura | |
| 2020/0068486 | A1 | 2/2020 | Asterjadhi et al. | |
| 2020/0112910 | A1 | 4/2020 | Cherian et al. | |
| 2020/0245160 | A1 * | 7/2020 | Chu | H04W 48/18 |

FOREIGN PATENT DOCUMENTS

| | | | |
|---|---|---|---|
| JP | 2019-220962 | 12/2019 | |
| KR | 10-0956192 | 5/2010 | |
| KR | 10-2015-0022787 | 3/2015 | |
| KR | 10-2015-0023018 | 3/2015 | |
| KR | 10-1561115 | 10/2015 | |
| KR | 20170049273 A * | 5/2017 | H04W 74/0816 |
| KR | 10-2039382 | 11/2019 | |

OTHER PUBLICATIONS

International Search Report for PCT/KR2021/012413 mailed Dec. 21, 2021, 5 pages.
Written Opinion of the ISA for PCT/KR2021/012413 mailed Dec. 21, 2021, 5 pages.
Office Action for KR Application No. 10-2020-0121656 dated Oct. 31, 2025 and English translation, 12 pages.
Office Action for KR Application No. 10-2020-0121656 issued Sep. 29, 2026 and English translation, 17 pages.

* cited by examiner

ELECTRONIC DEVICE FOR SEARCHING FOR WIRELESSLY CONNECTABLE EXTERNAL DEVICE, AND OPERATING METHOD THEREFOR

CROSS-REFERENCE TO RELATED APPLICATIONS

This application is a continuation of International Application No. PCT/KR2021/012413 designating the United States, filed on Sep. 13, 2021, in the Korean Intellectual Property Receiving Office and claiming priority to Korean Patent Application No. 10-2020-0121656, filed on Sep. 21, 2020, in the Korean Intellectual Property Office, the disclosures of which are incorporated by reference herein in their entireties.

BACKGROUND

Field

The disclosure relates to an electronic device for searching for an external device capable of wireless connection, and an operation method thereof.

Description of Related Art

An electronic device searches for a peripheral external electronic device and performs a wireless connection in order to exchange data. Recently, a search for a wirelessly connectable peripheral device has been utilized not only to exchange data with another device, but also to increase the accuracy of a location-based service.

SUMMARY

Embodiments of the disclosure provide an electronic device and a method for searching for a wirelessly connectable external electronic device.

Embodiments of the disclosure may provide a technology for effectively reducing an external device search time and/or power consumption for an external device search using a wideband scan in a wireless communication system.

An electronic device according to various example embodiments of the disclosure may include: a communication circuit, and a processor operatively connected to the communication circuit, wherein the processor is configured to: receive signals for at least two channels during a designated search time, identify whether a frame is a designated frame based on information included in at least a part of the signal, and store information of an access point (AP) based on a signal identified to have the designated frame.

A method according to an example embodiment may include: receiving signals of at least two channels during a designated search time, identifying whether a frame is a designated frame based on information included in at least a part of the signal, and storing information of an access point (AP) based on a signal identified to have the designated frame.

In a device and a method according to various example embodiments of the disclosure, by wideband-scanning of signals transmitted from wirelessly connectable external electronic devices, an electronic device can quickly search for an external electronic device and reduce power consumption for a device search.

The effects obtainable in the disclosure are not limited to the above-mentioned effects, and other effects that are not mentioned may be clearly understood by those skilled in the art to which the disclosure belongs, from the descriptions below.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

An electronic device may search for a wirelessly connectable external electronic device, based on a wideband scan.

Hereinafter, various example embodiments of the disclosure will be described with reference to the accompanying drawings. However, this is not intended to limit the disclosure to a specific form and should be understood to include various modifications, equivalents, and/or alternatives of embodiments of the disclosure.

Figure 1:
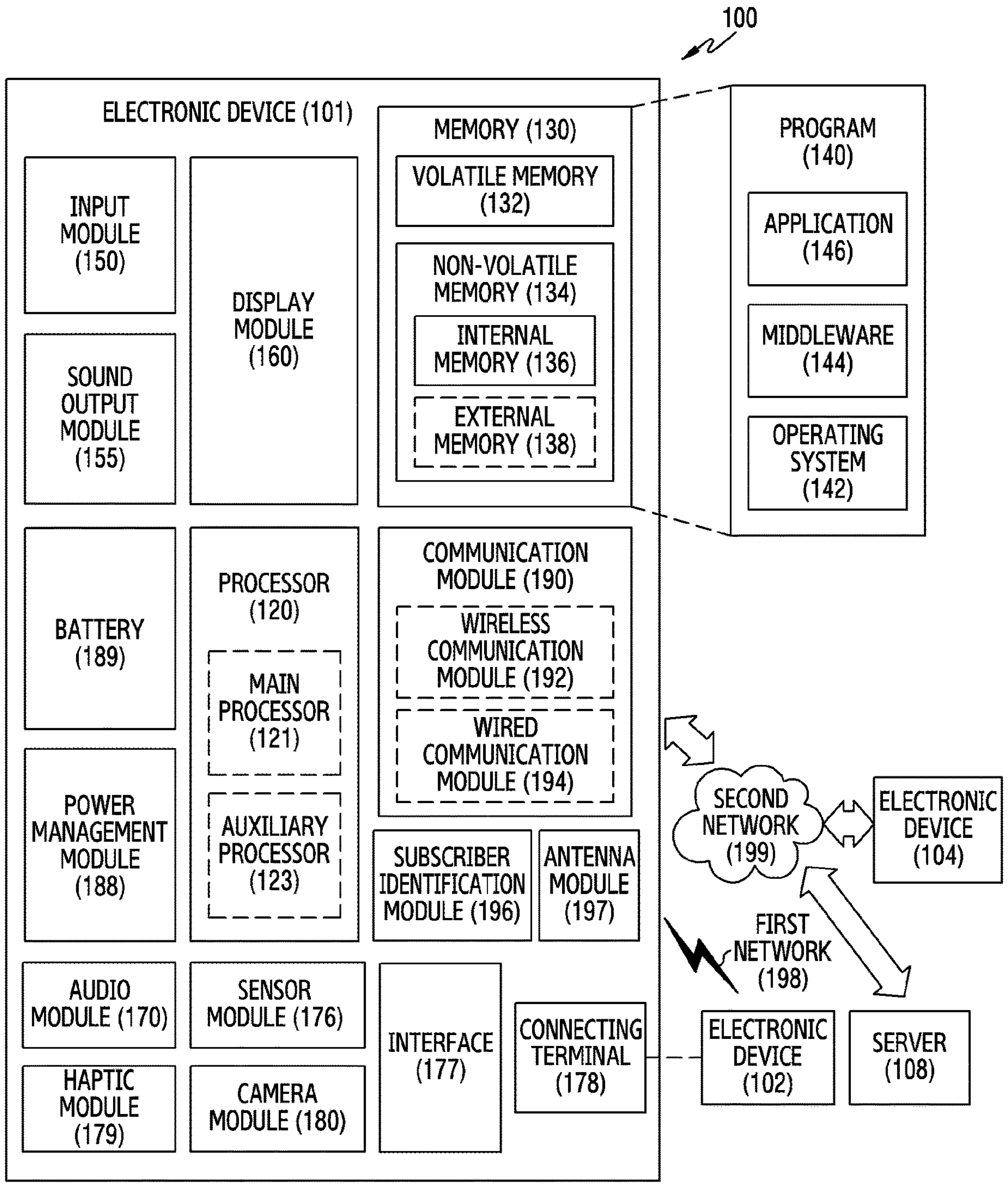
FIG. 1 is a block diagram illustrating an example electronic device in a network environment according to various embodiments.

FIG. 1 is a block diagram illustrating an example electronic device in a network environment, according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The memory 130 may include tasks for performing machine learning, neural network algorithms for performing the tasks, target functions, and input data or output data for commands related thereto.

The memory 130 may store, for example, data or instructions related to at least one other element of the electronic device 101. The instructions may be executed by at least one of the processor.

Figure 2:
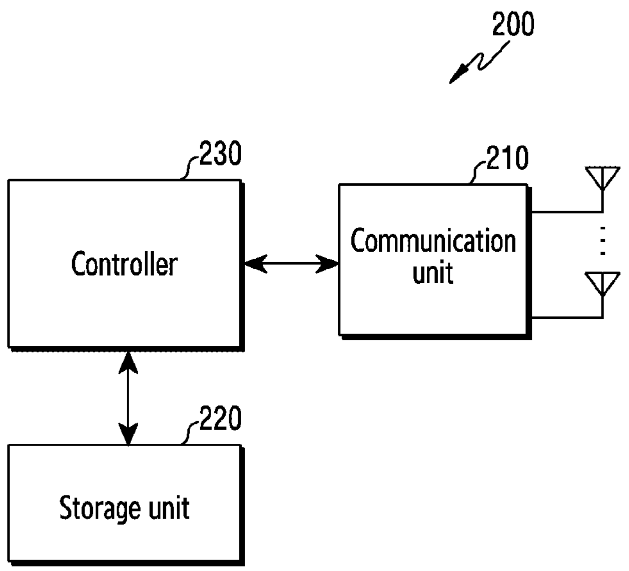
FIG. 2 is a block diagram illustrating an example configuration of the electronic device according to various embodiments.

FIG. 2 is a block diagram illustrating an example configuration 200 of the electronic device 101 according to various embodiments. The terms " . . . unit", " . . . device", etc. used hereinafter may refer to a unit configured to process at least one function or operation, and may be implemented as hardware, software, or a combination of hardware and software.

Referring to FIG. 2, the electronic device 101 includes a communication unit (e.g., including communication circuitry) 210, a storage unit (e.g., including a memory) 220, and a controller (e.g., including control and/or processing circuitry) 230.

The communication unit 210 may include various communication circuitry and performs functions for transmitting or receiving a signal via a wireless channel. For example, the communication unit 210 performs a function of conversion between a baseband signal and a bitstream according to a physical layer specification of a system. For example, during data transmission, the communication unit 210 generates complex symbols by encoding and modulating a transmission bitstream. When receiving data, the communication unit 210 restores the received bitstream by demodulating and decoding the baseband signal. The communication unit 210 up-converts the baseband signal into an RF band signal, transmits the up-converted RF band signal via an antenna, and then down-converts the RF band signal received via the antenna into a baseband signal. For example, the communication unit 210 may include a transmission filter, a reception filter, an amplifier, a mixer, an oscillator, a DAC, an ADC, and the like.

According to an embodiment, the communication unit 210 may encode a signal to be transmitted.

According to an embodiment, the communication unit 210 may decode a received signal. According to an embodiment, the communication unit 210 may decode at least a part of a received signal. According to an embodiment, at least a part of the received signal may include a header part in a frame of the received signal.

In addition, the communication unit 210 may include multiple transmission or reception paths. Further, the communication unit 210 may include at least one antenna array including multiple antenna elements. In terms of hardware, the communication unit 210 may include a digital circuit and an analog circuit (e.g., a radio frequency integrated circuit (RFIC)). The digital circuit and the analog circuit may be implemented in a single package. In addition, the communication unit 210 may include multiple RF chains. Further, the communication unit 310 may perform beamforming.

The communication unit 210 may include different communication modules each including, for example, various communication circuitry to process signals of different frequency bands. Furthermore, the communication unit 210 may include multiple communication modules to support multiple different radio access technologies. For example, different wireless access technologies may include Bluetooth low energy (BLE), wireless fidelity (Wi-Fi), Wi-Fi gigabyte (WiGig), a cellular network (e.g., long term evolution (LTE)), and the like. Further, different frequency bands may include a super high frequency (SHF) (e.g., 2.5 GHz and 5 GHz) band and a millimeter wave (mm wave) (e.g., 60 GHz) band.

The communication unit 210 transmits and receives a signal as described above. Accordingly, all or a part of the communication unit 210 may be referred to as "transmitter", "receiver", or "transceiver". In the following description, transmission and reception performed via a wireless channel are used in a sense including processing performed as described above by the wireless communication unit 210.

According to an embodiment, the communication unit 210 may perform a wireless communication connection to the external electronic device 102 by periodically transmitting signals to the external electronic device 102. According to an embodiment, the communication unit 210 may perform a wireless communication connection to the external electronic device 102 by detecting signals periodically received from the external electronic device 102.

The storage unit 220 may include a memory and stores data, such as a default program, an application program, and configuration information for operations of the electronic device 101. The storage unit 220 may include a volatile memory, a non-volatile memory, or a combination of a volatile memory and a non-volatile memory. The storage unit 220 provides stored data in response to a request of the controller 230. According to an embodiment, for a wireless communication connection in the communication unit 210, the storage unit 220 may store access point (AP) information, based on a received signal. According to an embodiment, the storage unit 220 may store at least one of channel information, signal period information, and signal length information, based on the signal received by the communication unit 210.

The controller 230 may include various control and/or processing circuitry and controls overall operations of the terminal. For example, the controller 230 transmits and receives a signal via the communication unit 210. Further, the controller 230 records and reads data in the storage unit 220. The controller 230 may perform functions of a protocol stack required by communication standards. To this end, the controller 230 may include at least one processor or microprocessor, or may be a part of a processor. A part of the communication unit 210 and the controller 230 may be referred to as a communication processor (CP). According to various embodiments, the controller 230 may include a mode determination unit for determining a mode of an RF module in a distributed manner. For example, the controller 230 may control the terminal to perform operations according to various embodiments described below.

According to an embodiment, the controller 230 may manage a wireless or wired connection between the electronic device 101 and the external electronic device 102. According to an embodiment, the controller 230 may receive a decoding result of at least a part of a signal from the communication unit 210. According to an embodiment, the controller 230 may identify a designated frame, based on the decoding result of at least a part of the signal. In an embodiment, if the signal is identified to have the designated frame, the controller 230 may store information of the designated frame in the storage 220. According to an embodiment, the controller 230 may control to perform a wireless communication connection to the external electronic device 102, based on the designated frame information. According to an embodiment, if the signal is identified to have an undesignated frame, the controller 230 may control standby of signal detection in a frequency band other than a frequency band in which the undesignated frame has been detected.

Figure 3:
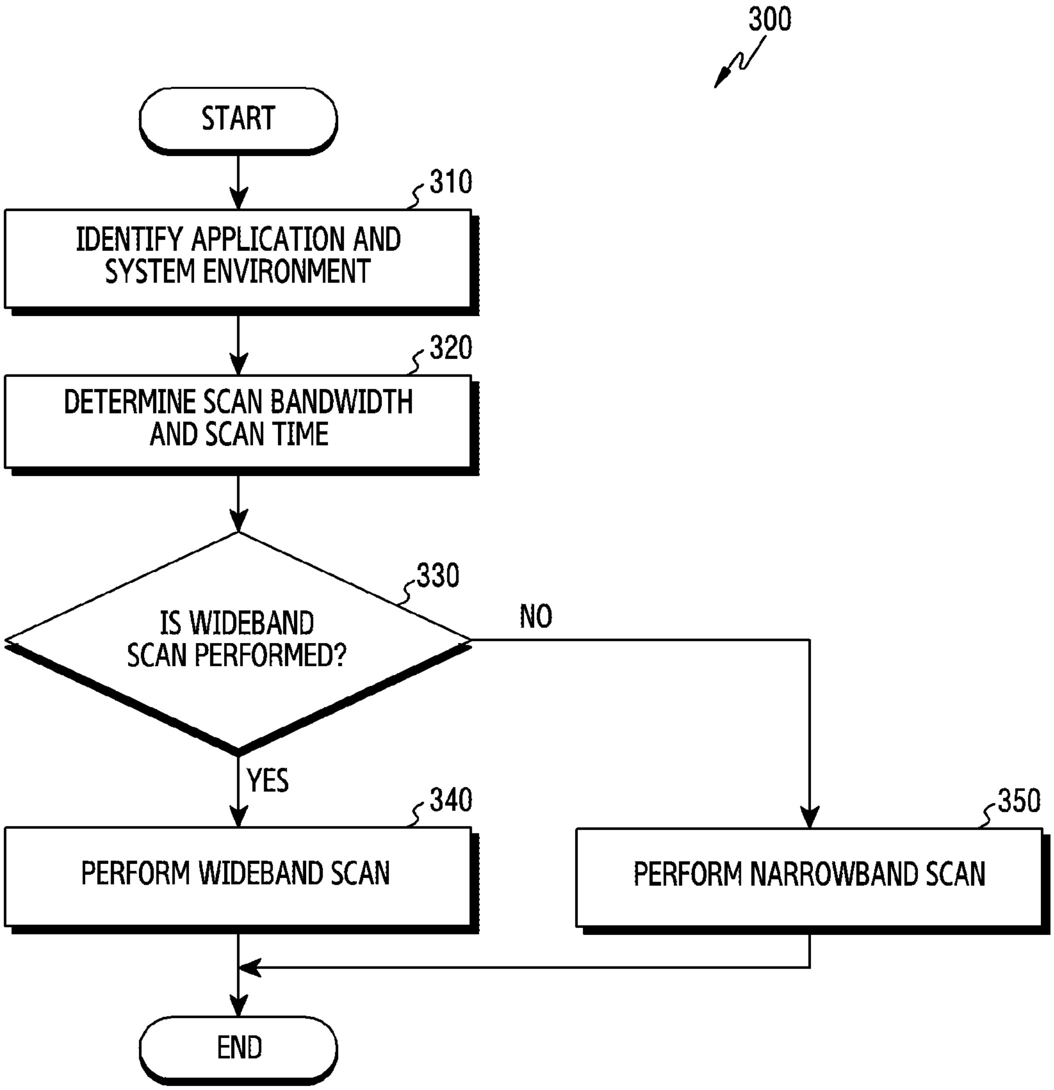
FIG. 3 is a flowchart illustrating an example operation of the electronic device for a device search according to various embodiments.

FIG. 3 is a flowchart 300 illustrating an example operation of the electronic device 101 for a device search according to various embodiments. The electronic device of FIG. 3 illustrates the electronic device 101 of FIG. 1. An external electronic device 102 of FIG. 3 illustrates the electronic device 102 of FIG. 1.

According to an embodiment, a wideband scan may refer to concurrently scanning at least two channels among multiple channels during a scan time. According to an embodiment, a narrowband scan may refer to detecting one of multiple channels during a scan time.

Referring to FIG. 3, in operation 310, according to an embodiment, the electronic device 101 may identify an application and a system environment. According to an embodiment, the electronic device 101 may identify at least one of a current situation of internal network resource use and a user interface (UI) use situation of an application of the electronic device 101.

According to an embodiment, the electronic device 101 may configure a scan time to be short when performing narrowband scanning. For example, if the electronic device 101 configures a scan time to be short, which is 110 ms, some beacon frames having a transmission period of 204 ms may not be detected, but a total scan time may be reduced. According to an embodiment, the electronic device 101 may configure a scan time to be long when performing wideband scanning. For example, if the electronic device 101 configures a scan time to be long, which is 220 ms, the total scan time may be increased, but a beacon frame having a transmission period of 204 ms may be detected.

According to an embodiment, the UI use situation of the application may include a situation in which a user uses a UI for configuration of a Wi-Fi connection. According to an embodiment, in a situation in which a user uses a UI for configuration of a Wi-Fi connection, the electronic device 101 may configure the scan time to be long in order to search for a connectable nearby access points (AP) without omission. According to an embodiment, the UI use situation of the application may include a situation of using a Wi-Fi search for providing of a service in the background. The service may include a location-based service. According to an embodiment, in the situation of using a Wi-Fi search in the background to provide a location-based service, the electronic device 101 may configure the scan time to be short in order to quickly identify a location of the electronic device 101.

According to an embodiment, the current situation of internal network resource use may be determined according to latency of data transmitted in the network. According to an embodiment, when an application affected by data transmission latency is running in the electronic device 101, the electronic device 101 may configure a scan time to be short. According to an embodiment, when the electronic device 101 transmits a large amount of data through the network, data transmission latency may occur. In this case, the electronic device 101 may configure a scan time to be short in order to prevent and/or reduce transmission latency due to the large amount of data.

In operation 320, according to an embodiment, the electronic device 101 may determine (and/or configure) a scan bandwidth or a scan time. According to an embodiment, the electronic device 101 may determine the scan bandwidth or the scan time, based on at least one of the UI use situation and the current situation of internal network resource use.

In operation 330, according to an embodiment, the electronic device 101 may determine whether to perform wideband scanning According to an embodiment, the electronic device 101 may determine whether to perform wideband scanning, based on the scan bandwidth or scan time determined according to the UI use situation or the current situation of network resource use. For example, if the electronic device 101 determines the scan bandwidth to be 20 MHz according to the UI use situation or the current situation of network resource use, the electronic device 101 may perform narrowband scanning according to the determined scan bandwidth. For another example, if the electronic device 101 determines the scan bandwidth to be 80 MHz according to the UI use situation or the current situation of network resource use, the electronic device 101 may perform wideband scanning according to the determined scan bandwidth.

In operation 340, according to an embodiment, the electronic device 101 may perform wideband scanning (Yes in operation 330). According to an embodiment, the electronic device 101 may perform wideband scanning during the determined scan time. According to an embodiment, the electronic device 101 may scan a signal in a part corresponding to a wideband scan bandwidth (e.g., 80 MHz) in the entire frequency band during the determined scan time. According to an embodiment, a wideband scan bandwidth may be wider than a narrowband scan bandwidth. According to an embodiment, the electronic device 101 may increase a scan speed by performing wideband scanning According to an embodiment, the electronic device 101 may shorten a search time for the external electronic device 102 by performing wideband scanning. According to an embodiment, the electronic device 101 may acquire location information of the electronic device 101 via a communication connection to the searched external electronic device 102 by performing wideband scanning According to an embodiment, by performing wideband scanning, the electronic device 101 may improve accuracy of a location-based service, based on the acquired location information. According to an embodiment, a specific embodiment relating to the wideband scan may be described in FIG. 4A and FIG. 4B.

In operation 350, according to an embodiment, the electronic device 101 may perform narrowband scanning (No in operation 330). According to an embodiment, the electronic device 101 may perform narrowband scanning during the determined scan time. According to an embodiment, the electronic device 101 may scan a signal in a part corresponding to a narrowband scan bandwidth (e.g., 20 MHz) in the entire frequency band during the determined scan time. The narrowband scan bandwidth may be narrower than the wideband scan bandwidth. According to an embodiment, the electronic device 101 may increase accuracy of the communication connection to the external electronic device 102 by performing narrowband scanning According to an embodiment, a specific embodiment relating to the narrowband scan may be described in FIG. 4A and FIG. 4B.

Figure 4A:
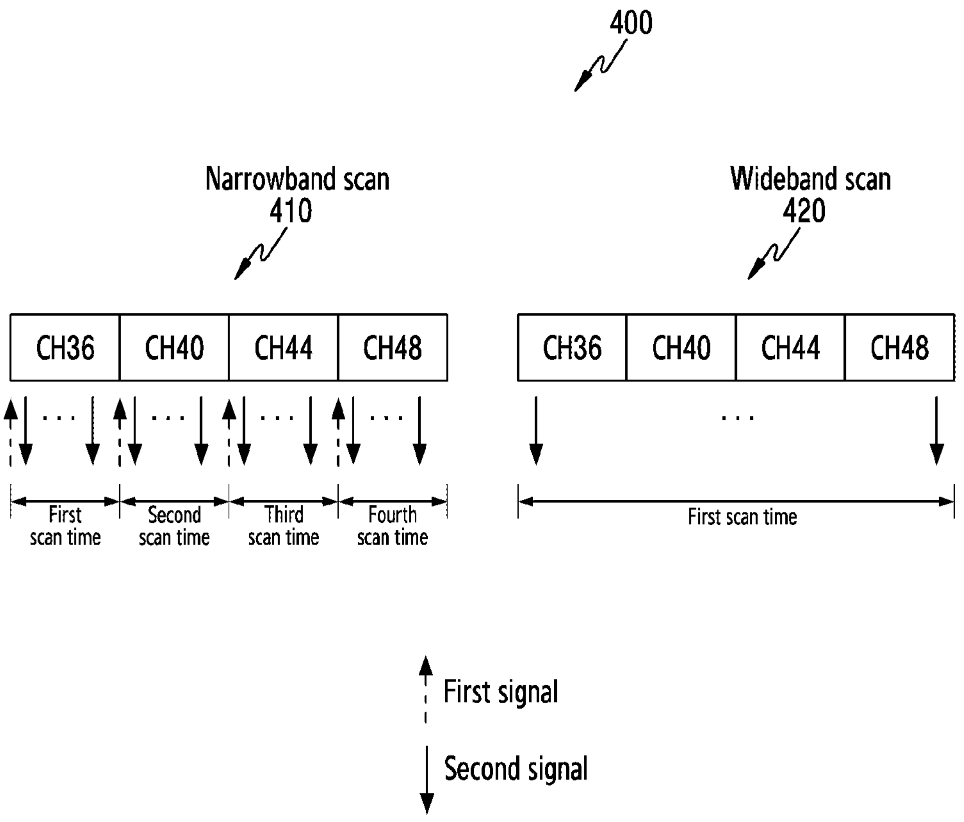
FIG. 4A is a diagram illustrating an example of wideband scanning and an active scan of narrowband scanning for an external electronic device search according to an various embodiments.

FIG. 4A is a diagram illustrating an example 400 of wideband scanning and an active scan of narrowband scanning for an external electronic device search according to various embodiments. An electronic device of FIG. 4A illustrates the electronic device 101 of FIG. 1. An external electronic device of FIG. 4A illustrates the electronic device 102 of FIG. 1.

Referring to FIG. 4A, the electronic device 101 may perform narrowband scanning 410 when searching for the external electronic device 102. According to an embodiment, the electronic device 101 may sequentially scan frequency bands in units of narrowband scan bandwidths (e.g., 20 MHz). According to an embodiment, the electronic device 101 may not scan another channel (or another frequency band) while scanning a specific channel (or a specific frequency band). According to an embodiment, when performing narrowband scanning, the electronic device may scan one channel among multiple channels (e.g., channel 36 (CH36), channel 40 (CH40), channel 44 (CH44), and channel 48 (CH48)) during one scan time (e.g., a first scan time, a second scan time, a third scan time, and a fourth scan time). For example, the electronic device 101 may scan CH36 during the first scan time and may scan CH40 during the second scan time. A frequency bandwidth of one channel (e.g., CH36, CH40, CH44, or CH48) may be assumed to be 20 MHz. According to an embodiment, when performing narrowband scanning, the electronic device 101 may perform an active scan on a non-dynamic frequency selection (DFS) channel (e.g., CH36, CH40, CH44, and CH48). For example, when performing narrowband scanning, the electronic device 101 may perform an active scan on CH36 which is a non-DFS channel during the first scan time. According to an embodiment, at the start of the first scan time, the electronic device 101 may transmit, in a broadcast scheme, a first signal to external electronic devices 102 occupying a frequency band corresponding to a frequency band of CH36. The first signal may include a probe request frame. According to an embodiment, the electronic device 101 may receive second signals from the external electronic devices 102 corresponding to the frequency band of CH36 during the first scan time in response to the first signal. According to an embodiment, the electronic device 101 may identify reception results of the second signals and may add the same to a scan result of the external electronic device 102. The second signal may include at least one of a probe response frame or a beacon frame. According to an embodiment, the electronic device 101 may sequentially perform an active scan of narrowband scanning in a 20 MHz bandwidth unit for the remaining channels (e.g., CH40, CH44, and CH48) during the respective scan times (e.g., the second scan time, the third scan time, and the fourth scan time) in the same manner. For example, for the active scan of narrowband scanning, when the electronic device 101 configures the scan time to be 80 ms (millisecond), a time taken to scan all four channels (e.g., CH36, CH40, CH44, and CH48) is about 320 ms. For the active scan of narrowband scanning, even if the scan time is long and the external electronic device 102 that is actually connectable does not exist, unnecessary overhead may occur by generating the first signal and the second signal.

Referring to FIG. 4A, the electronic device 101 may perform wideband scanning 420 when searching for the external electronic device 102. According to an embodiment, the electronic device 101 may scan frequency bands in units of wideband scan bandwidths (e.g., 80 MHz).

According to an embodiment, when performing wideband scanning, the electronic device may scan multiple channels (e.g., channel 36 (CH36), channel 40 (CH40), channel 44 (CH44), and channel 48 (CH48)) during one scan time (e.g., the first scan time). For example, the electronic device 101 may concurrently scan multiple channels of CH36, CH40, CH44, and CH48 during the first scan time. A frequency bandwidth of one channel (e.g., CH36, CH40, CH44, or CH48) may be assumed to be 20 MHz. According to an embodiment, the electronic device 101 may perform wideband scanning on non-dynamic frequency selection (DFS) channels (e.g., CH36, CH40, CH44, and CH48). For example, the electronic device 101 may perform wideband scanning on multiple non-DFS channels of CH36, CH40, CH44, and CH48 during the first scan time. According to an embodiment, the electronic device 101 may receive second signals from the external electronic devices 102 occupying frequency bands corresponding to frequency bands of CH36, CH40, CH44, and CH48 during the first scan time. According to an embodiment, the electronic device 101 may identify reception results of the second signals and may add the same to a scan result of the external electronic device 102. The second signal may include at least one of a probe response frame or a beacon frame. According to an embodiment, the electronic device 101 may perform wideband scanning in an 80 MHz bandwidth unit for the remaining channels during the respective scan times (e.g., the second scan time, the third scan time, and the fourth scan time) in the same manner. For example, for wideband scanning, when the electronic device 101 configures the scan time to be 110 ms (millisecond), a time taken to scan all four channels (e.g., CH36, CH40, CH44, and CH48) is about 110 ms. In the case of wideband scanning, more channels may be scanned within a shorter scan time compared to the active scan of narrowband scanning.

Figure 4B:
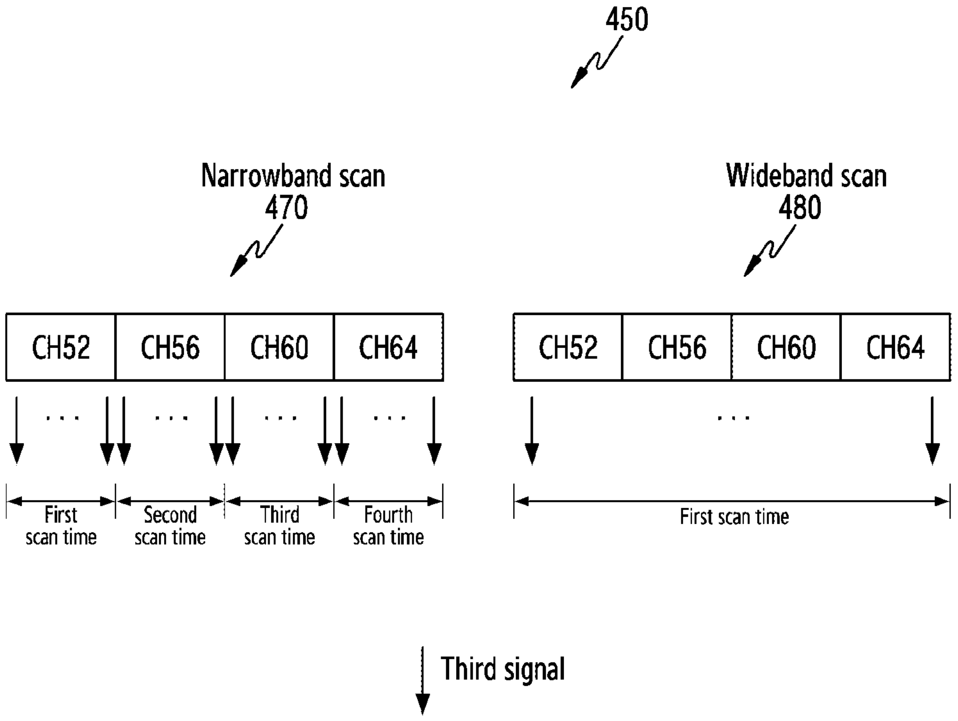
FIG. 4B is a diagram illustrating an example of wideband scanning and a passive scan of narrowband scanning for an external electronic device search according to various embodiments.

FIG. 4B is a diagram illustrating an example 450 of wideband scanning and a passive scan of narrowband scanning for an external electronic device search according to various embodiments. An electronic device of FIG. 4B illustrates the electronic device 101 of FIG. 1. An external electronic device of FIG. 4B illustrates the electronic device 102 of FIG. 1.

Referring to FIG. 4B, the electronic device 101 may perform narrowband scanning 470 when searching for the external electronic device 102. According to an embodiment, the electronic device 101 may sequentially scan frequency bands in units of narrowband scan bandwidths (e.g., 20 MHz). According to an embodiment, the electronic device 101 may not scan another channel (or another frequency band) while scanning a specific channel (or a specific frequency band). According to an embodiment, when performing narrowband scanning, the electronic device may scan one channel among multiple channels (e.g., channel 52 (CH52), channel 56 (CH56), channel 60 (CH60), and channel 64 (CH64)) during one scan time (e.g., a first scan time, a second scan time, a third scan time, and a fourth scan time). For example, the electronic device 101 may scan CH52 during the first scan time and may scan CH56 during the second scan time. A frequency bandwidth of one channel (e.g., CH52, CH56, CH60, or CH64) may be assumed to be 20 MHz. According to an embodiment, when performing narrowband scanning, the electronic device 101 may perform a passive scan on a dynamic frequency selection (DFS) channel (e.g., CH52, CH56, CH60, and CH64). For example, when performing narrowband scanning, the electronic device 101 may perform a passive scan on CH52 which is a DFS channel during the first scan time. According to an embodiment, the electronic device 101 may perform a passive scan to identify the presence of the external electronic device 102 by receiving a third signal periodically received from the external electronic device 102.

According to an embodiment, the electronic device 101 may receive third signals from external electronic devices 102 occupying a frequency band corresponding to a frequency band of CH52 during the first scan time. According to an embodiment, the electronic device 101 may identify reception results of the third signals and may add the same to a scan result of the external electronic device 102. The third signal may include a beacon frame. According to an embodiment, the electronic device 101 may sequentially perform a passive scan of narrowband scanning in a 20 MHz bandwidth unit for the remaining channels (e.g., CH56, CH60, and CH64) during the respective scan times (e.g., the second scan time, the third scan time, and the fourth scan time) in the same manner. For example, if the electronic device 101 performs a passive scan of narrowband scanning, when the scan time is configured to be 110 ms, a time taken to scan all four channels (e.g., CH52, CH56, CH60, CH64) is about 440 ms. For the passive scan of narrowband scanning, the scan time for the external electronic device 102 may be long, and power consumed during the scan time may increase.

Referring to FIG. 4B, the electronic device 101 may perform wideband scanning 480 when searching for the external electronic device 102. According to an embodiment, the electronic device 101 may scan frequency bands in units of wideband scan bandwidths (e.g., 80 MHz).

According to an embodiment, when performing wideband scanning, the electronic device may scan multiple channels (e.g., channel 52 (CH52), channel 56 (CH56), channel 60 (CH60), and channel 64 (CH64)) during one scan time (e.g., the first scan time). For example, the electronic device 101 may concurrently scan multiple channels of CH52, CH56, CH60, and CH64 during the first scan time. A frequency bandwidth of one channel (e.g., CH52, CH56, CH60, or CH64) may be assumed to be 20 MHz. According to an embodiment, the electronic device 101 may perform wideband scanning on dynamic frequency selection (DFS) channels (e.g., CH52, CH56, CH60, and CH64). For example, the electronic device 101 may perform wideband scanning on multiple DFS channels of CH52, CH56, CH60, and CH64 during the first scan time. According to an embodiment, the electronic device 101 may receive third signals from the external electronic devices 102 occupying frequency bands corresponding to frequency bands of CH52, CH56, CH60, and CH64 during the first scan time. According to an embodiment, the electronic device 101 may identify reception results of the third signals. According to an embodiment, the electronic device 101 may add the reception results of the third signals to a scan result of the external electronic device 102. The third signal may include a beacon frame. According to an embodiment, the electronic device 101 may perform wideband scanning in an 80 MHz bandwidth unit for the remaining channels during the respective scan times (e.g., the second scan time, the third scan time, and the fourth scan time) in the same manner. For example, for wideband scanning, when the electronic device 101 configures the scan time to be 110 ms (millisecond), a time taken to scan all four channels (e.g., CH36, CH40, CH44, and CH48) is about 110 ms. In the case of wideband scanning, more channels may be scanned within a shorter scan time compared to the passive scan of narrowband scanning, and power consumed during the scan time may be effectively reduced.

Figure 5:
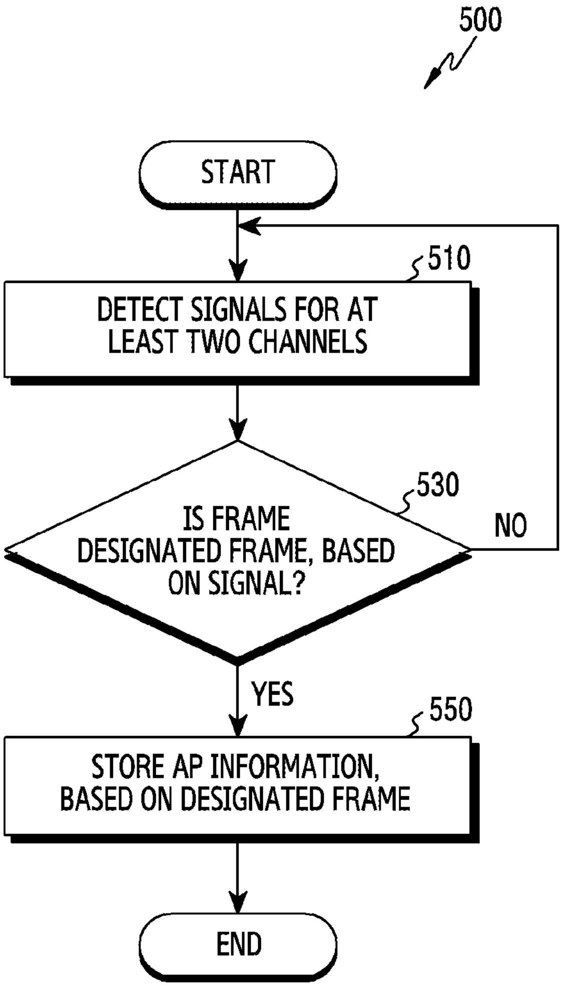
FIG. 5 is a flowchart illustrating an example operation of the electronic device for a wideband scan according to various embodiments.

FIG. 5 is a flowchart 500 illustrating an example operation of the electronic device 101 for a wideband scan according to various embodiments. The electronic device 101 of FIG. 5 illustrates the electronic device 101 of FIG. 1. An external electronic device 102 of FIG. 5 illustrates the electronic device 102 of FIG. 1.

Referring to FIG. 5, in operation 510, according to an embodiment, the electronic device 101 may detect signals for at least two channels. That is, the electronic device 101 may perform wideband scanning According to an embodiment, the electronic device 101 may concurrently detect signals for at least two channels during at least a part of a scan time. According to an embodiment, each of at least two channels may have a designated bandwidth (e.g., 20 MHz). According to an embodiment, the electronic device 101 may detect a signal transmitted from the external electronic device 102. According to an embodiment, the electronic device 101 may receive signals periodically transmitted from the external electronic device 102. According to an embodiment, the external electronic device 102 is a device that connects the electronic device 101 and an external server, and may be referred to as an access point (AP)", a "wireless point", a Wi-Fi router" or other terms having equivalent technical meaning. According to an embodiment, a signal may include a management frame, a control frame, and a data frame. According to an embodiment, a signal may include a beacon frame as a management frame. According to an embodiment, the electronic device 101 may perform a wireless connection to the external electronic device 102 by decoding a signal received from the external electronic device 102.

In operation 530, the electronic device 101 may identify, based on the signal, whether a frame is a designated frame. According to an embodiment, the electronic device 101 may identify whether a frame is a designated frame, based on at least a part of the signal. According to an embodiment, the electronic device 101 may identify the designated frame, based on a decoding result of at least a part of the signal. In an embodiment, the electronic device 101 may identify information included in at least a part of the signal by decoding the at least a part of the signal. According to an embodiment, the electronic device 101 may identify the designated frame, based on the information included in the at least a part of the signal. According to an embodiment, the information included in at least a part of the signal may include, as information on the designated frame, at least one of transmission rate information or frame length information of the designated frame.

According to an embodiment, if the detected signal is identified not to have the designated frame (No in operation 530), the electronic device 101 may return to operation 510 to detect signals of at least two channels again.

In operation 550, according to an embodiment, if the detected signal is identified to have the designated frame (Yes in operation 530), the electronic device 101 may store AP information, based on the designated frame.

According to an embodiment, if the detected signal is identified to have the designated frame, the electronic device 101 may store information of the external electronic device 102, based on the designated frame. According to an embodiment, the electronic device 101 may store information of the external electronic device 102, based on an identification result of the designated frame. According to an embodiment, the electronic device 101 may add the information of the external electronic device 102 to a search result of the external electronic device 102.

Although not illustrated in FIG. 5, according to an embodiment, if information of at least two external electronic devices 102 is stored, the electronic device 101 may compare the stored information and select the external electronic device 201 to be wirelessly connected to the electronic device 101. According to an embodiment, the electronic device 101 may perform wireless connection to the selected external electronic device 102. According to an embodiment, the electronic device 101 may be wirelessly connected to the identified external electronic device 102 using a designated radio access technology (RAT). According to an embodiment, the designated RAT may include Wi-Fi, Bluetooth, ZigBee, or a combination thereof.

Although not illustrated in FIG. 5, according to an embodiment, the electronic device 101 may identify whether a configured scan time has been exceeded. According to an embodiment, as a parallel operation to the operations of FIG. 5, the electronic device 101 may identify whether the configured scan time has been exceeded. According to an embodiment, the electronic device 101 may perform the operations of FIG. 5 if the scan time is not exceeded. According to an embodiment, the electronic device 101 may terminate scanning of channels if the scan time has been exceeded.

According to an embodiment, the frame of the detected signal may include any one of a data frame, a control frame, and a management frame. According to an embodiment, the designated frame may include a beacon frame in a management frame. According to an embodiment, the designated frame may inform the electronic device 101 of the presence of the external electronic device 102. According to an embodiment, the designated frame may induce detection of the external electronic device 102 by the electronic device 101. According to an embodiment, the designated frame may be transmitted at a designated period.

Figure 6:
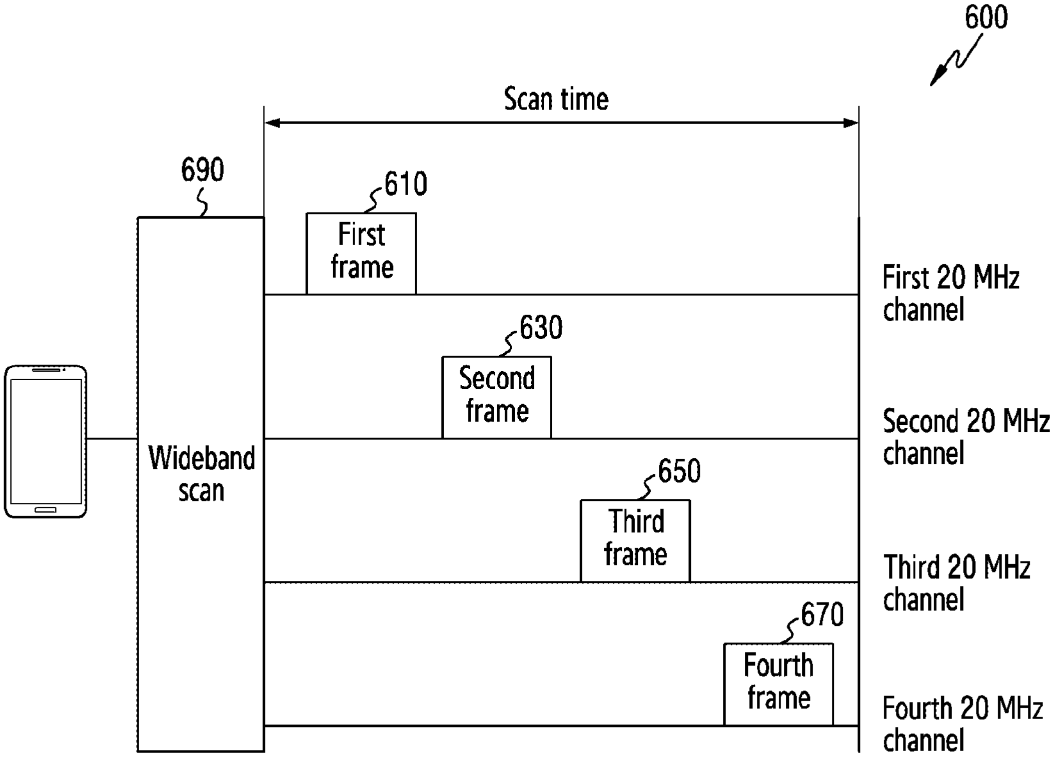
FIG. 6 is a diagram illustrating an example operation of the electronic device for a wideband scan according to various embodiments.

FIG. 6 is a diagram illustrating an example 600 operation of the electronic device for a wideband scan according to various embodiments. The electronic device of FIG. 6 illustrates the electronic device 101 of FIG. 1. An external electronic device of FIG. 6 illustrates the electronic device 102 of FIG. 1.

Referring to FIG. 6, according to an embodiment, the electronic device 101 may perform wideband scanning 690 on at least two channels for which channel bonding has been performed. According to an embodiment, the electronic device 101 may perform wideband scanning 690 on at least two channels (e.g., a first 20 MHz channel, a second 20 MHz channel, a third 20 MHz channel, and a fourth 20 MHz channel) during a scan time. According to an embodiment, a channel may have a bandwidth of 20 MHz or 40 MHz. According to an embodiment, the electronic device 101 may detect one of frames (e.g., a first frame 610, a second frame 630, a third frame 650, and a fourth frame 670) by performing wideband scanning 690 on at least two channels. According to an embodiment, the frames are received from the corresponding external electronic devices 102. According to an embodiment, the external electronic devices 102 correspond to respective channels. According to an embodiment, the electronic device 101 may receive the frames of the respective external electronic devices 102 on the channels corresponding to the respective external electronic devices 102. For example, the electronic device 101 may receive the first frame 610 of external electronic device 1 102 on the first 20 MHz channel corresponding to external electronic device 1 102. For example, the electronic device 101 may receive the second frame 630 of external electronic device 2 102 on the second 20 MHz channel corresponding to external electronic device 2 102. For example, the electronic device 101 may receive the third frame 650 of external electronic device 3 102 on the third 20 MHz channel corresponding to external electronic device 3 102. For example, the electronic device 101 may receive the fourth frame 670 of external electronic device 4 102 on the fourth 20 MHz channel corresponding to external electronic device 4 102. According to an embodiment, the frames are management frames and may include at least one of a data frame, a control frame, and a beacon frame.

According to an embodiment, if a frame is detected, the electronic device 101 may decode the frame. For example, if the electronic device 101 detects the first frame 610 during wideband scanning 690, the first frame 610 may be decoded. According to an embodiment, the electronic device 101 may add a decoding result to a scan result of the external electronic device 102 and may update scanned channel information. According to an embodiment, based on the decoding result, the electronic device 101 may perform wireless communication connection to the external electronic device 102 which has transmitted the frame.

Figure 7:
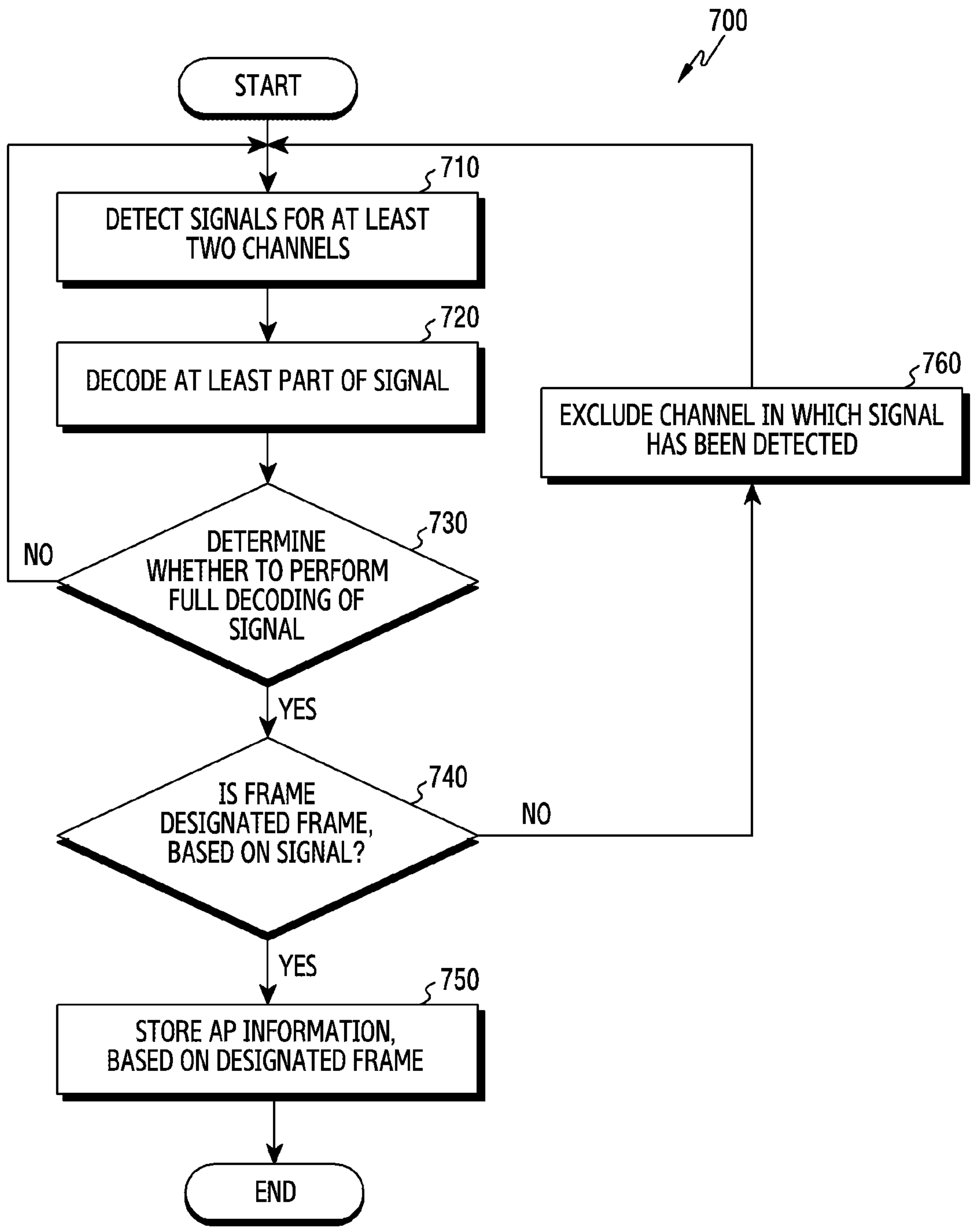
FIG. 7 is a flowchart illustrating an example operation of the electronic device for searching for an external electronic device, based on a decoding result of at least a part of a signal according to various embodiments.

FIG. 7 is a flowchart 700 illustrating an example operation of the electronic device for searching for an external electronic device, based on a decoding result of at least a part of a signal according to various embodiments. The electronic device of FIG. 7 illustrates the electronic device 101 of FIG. 1. The external electronic device of FIG. 7 illustrates the electronic device 102 of FIG. 1.

Referring to FIG. 7, in operation 710, according to an embodiment, the electronic device 101 may detect signals of at least two channels when performing wideband scanning. According to an embodiment, the electronic device 101 may concurrently detect signals for at least two channels during at least a partial scan time. According to an embodiment, each of at least two channels may have a designated bandwidth (e.g., 20 MHz). According to an embodiment, the electronic device 101 may detect a signal transmitted from the external electronic device 102. According to an embodiment, the electronic device 101 may receive signals periodically transmitted from the external electronic device 102. According to an embodiment, the external electronic device 102 is a device that connects the electronic device 101 and an external server, and may be referred to as an access point (AP)", a "wireless point", a Wi-Fi router" or other terms having equivalent technical meaning. According to an embodiment, a signal may include a management frame, a control frame, and a data frame. According to an embodiment, a signal may include a beacon frame as a management frame. According to an embodiment, the electronic device 101 may perform a wireless connection to the external electronic device 102 by decoding a signal received from the external electronic device 102.

In operation 720, according to an embodiment, the electronic device 101 may decode at least a part of the detected signal. According to an embodiment, the electronic device 101 may identify information on a frame of the detected signal by decoding at least a part of the signal. According to an embodiment, information of the detected frame may include at least one of a frame transmission rate or a frame length. According to an embodiment, a transmission rate of the detected frame may correspond to a transmission rate of a designated frame. According to an embodiment, a length of the detected frame may correspond to a length of the designated frame. According to an embodiment, at least a part of the signal may include a physical layer header (PHY) as a frame header.

According to an embodiment, the PHY header may include at least one of a legacy preamble, a high throughput (HT) preamble, a very high throughput (VHT) preamble, a high efficiency (HE) preamble, or a combination thereof.

According to an embodiment, the electronic device 101 may determine whether to perform full decoding of the detected signal, based on a decoding result of at least a part of the signal. According to an embodiment, the electronic device 101 may prevent and/or reduce unnecessary full decoding, by decoding at least a part of the signal. According to an embodiment, the electronic device 101 may prevent and/or reduce throughput overhead due to unnecessary full decoding, by decoding at least a part of the signal. According to an embodiment, the electronic device 101 may prevent and/or reduce waste of time resources due to unnecessary full decoding, by decoding at least a part of the signal. According to an embodiment, the electronic device 101 may increase channel scan efficiency without adding hardware logic, by decoding at least a part of the signal.

In operation 730, according to an embodiment, the electronic device 101 may determine whether to perform full decoding of the signal. According to an embodiment, the electronic device 101 may determine whether to perform full decoding of the signal, based on the decoding result of at least a part of the signal. According to an embodiment, the electronic device 101 may predict a frame type of the detected signal, based on information included in at least a part of the signal. According to an embodiment, the electronic device 101 may predict a frame type of the detected signal by comparing the transmission rate of the detected frame with a reference value of a transmission rate of the designated frame. According to an embodiment, the electronic device 101 may predict a frame type of the detected signal by comparing the length of the detected frame with a reference value of a length of the designated frame. According to an embodiment, the reference value of the transmission rate and the reference value of the frame length may be values pre-stored in the electronic device 101.

According to an embodiment, the electronic device 101 may determine whether to perform full decoding of the signal, according to the predicted frame type. According to an embodiment, if it is predicted that the frame type is the designated frame, the electronic device 101 may perform full decoding of the signal. According to an embodiment, if it is predicted that the frame type is not the designated frame, the electronic device 101 may return to operation 710 and detect signals for at least two channels.

In operation 740, according to an embodiment, the electronic device 101 may identify, based on the signal, whether the signal frame is the designated frame. According to an embodiment, the electronic device 101 may identify whether the signal frame is the designated frame, based on the decoding result of the signal. According to an embodiment, the electronic device 101 may identify whether the frame of the detected signal is the designated frame, based on a full decoding result of the signal.

In operation 750, according to an embodiment, if the frame of the detected signal is identified to be the designated frame (Yes in operation 740), the electronic device 101 may store AP information, based on the detected frame.

According to an embodiment, if the frame of the detected signal is identified to be the designated frame, the electronic device 101 may store information of the external electronic device 102, based on the detected frame. According to an embodiment, the electronic device 101 may store information of the external electronic device 102, based on an identification result of the detected frame. According to an embodiment, the electronic device 101 may add the information of the external electronic device 102, which is included in the detected frame, to a search result of the external electronic device 102.

In operation 760, according to an embodiment, if the frame of the detected signal is identified not to be the designated frame (No in operation 740), the electronic device 101 may exclude a channel in which the signal is detected. According to an embodiment, the electronic device 101 may exclude the channel, in which full decoding has been performed, from among channels for detecting signals. According to an embodiment, the electronic device 101 may exclude a channel in which a frame other than the designated frame has been detected. According to an embodiment, since the frame of the detected signal is not the designated frame, the electronic device 101 may exclude the corresponding channel from the channels for detecting signals. According to an embodiment, the electronic device 101 may detect signals for at least two channels among channels remaining after excluding the channel in which the frame identified to be a frame other than the designated frame has been detected. According to an embodiment, based on a decoding result of the frame identified to be other than the designated frame, the electronic device 101 may determine a period from which a signal search in the channel, in which the corresponding frame has been detected, is excluded. According to an embodiment, the electronic device 101 may perform signal search for at least two channels among the channels remaining after excluding the channel in which the frame identified to be a frame other than the designated frame has been detected, during the period from which a signal search in the detected channel is excluded.

Although not illustrated in FIG. 7, according to an embodiment, if information of at least two external electronic devices 102 is stored, the electronic device 101 may select, based on the stored information, the external electronic device 102 to perform wireless connection to the electronic device 101. According to an embodiment, the electronic device 101 may select the external electronic device 102 to perform wireless connection to the electronic device 101, by comparing the stored information. According to an embodiment, the electronic device 101 may perform wireless connection to the selected external electronic device 102. According to an embodiment, the electronic device 101 may be wirelessly connected to the identified external electronic device 102 using a designated radio access technology (RAT). According to an embodiment, the designated RAT may include Wi-Fi, Bluetooth, ZigBee, or a combination thereof.

Although not illustrated in FIG. 7, according to an embodiment, the electronic device 101 may identify whether a configured scan time has been exceeded. According to an embodiment, as a parallel operation to the operations of FIG. 7, the electronic device 101 may identify whether the configured scan time has been exceeded. According to an embodiment, the electronic device 101 may perform the operations of FIG. 7 if the scan time is not exceeded. According to an embodiment, the electronic device 101 may terminate scanning of channels if the scan time has been exceeded.

Figure 8:
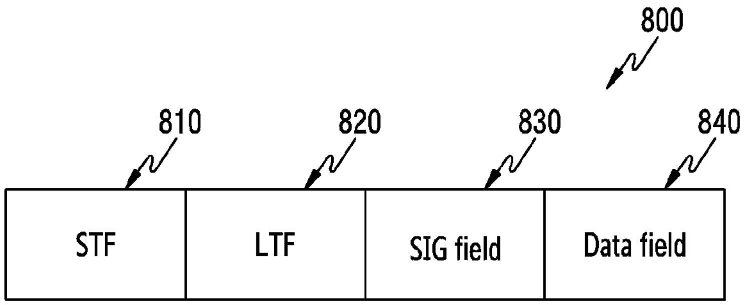
FIG. 8 is a diagram illustrating an example structure of a signal received from an external electronic device according to various embodiments.

FIG. 8 is a diagram illustrating an example structure 800 of a signal received from an external electronic device according to various embodiments. The electronic device of FIG. 8 illustrates the electronic device 101 of FIG. 1. The external electronic device of FIG. 8 illustrates the electronic device 102 of FIG. 1.

Referring to FIG. 8, a signal 800 received from an external electronic device may include a short training field (STF) 810, a long training field (LTF) 820, a signal (SIG) field 830, and a data field 840.

According to an embodiment, the short training field (STF) 810 is a part of the signal received from the external electronic device, and may be included in a physical layer header (PHY). According to an embodiment, the PHY header may include at least one of a legacy preamble, a high throughput (HT) preamble, a very high throughput (VHT) preamble, a high efficiency (HE) preamble, or a combination thereof.

According to an embodiment, the electronic device 101 may obtain frame timing, based on information included in the STF 810. According to an embodiment, the electronic device 101 may identify, based on the information included in the STF 810, whether a signal (e.g., a Wi-Fi signal) of the external electronic device for wireless communication connection is included.

According to an embodiment, the STF 810 may include a legacy-short training field (L-STF), a high efficiency-short training field (HE-STF), a high throughput-short training field (HT-STF), and a very high throughput-short training field (VHT-STF).

According to an embodiment, the long training field (LTF) 820 may be included in the PHY header of the signal received from the external electronic device. According to an embodiment, the electronic device 101 may obtain frequency offset information, based on a decoding result of the LTF 820. According to an embodiment, the electronic device 101 may perform channel estimation based on the decoding result of the LTF 820. According to an embodiment, the LTF 820 mm include a legacy-long training field (L-LTF), a high efficiency-long training field (HE-LTF), a high throughput-long training field (HT-LTF), and a very high throughput-long training field (VHT-LTF).

According to an embodiment, the signal (SIG) field 830 may be included in the PHY header of the signal received from the external electronic device. According to an embodiment, the electronic device 101 may demodulate the data field, based on a decoding result of the SIG field 830. According to an embodiment, the electronic device 101 may decode the data field, based on the decoding result of the SIG field 830. According to an embodiment, the electronic device 101 may identify at least one of frame transmission rate information or frame length information, based on the decoding result of the SIG field 830. According to an embodiment, the electronic device 101 may predict whether a received frame is a designated frame, based on at least one of transmission rate information of the frame or length information of the frame. According to an embodiment, the electronic device 101 may predict whether the received frame is the designated frame by comparing the transmission rate information of the frame with transmission rate information of the designated frame. According to an embodiment, the electronic device 101 may predict whether the received frame is the designated frame by comparing the length information of the frame with length information of the designated frame. According to an embodiment, the SIG field 830 may include a legacy-signal (L-SIG) field, a high efficiency-signal (HE-SIG) field, and a very high throughput-signal (VHT-SIG) field.

According to an embodiment, the data field 840 may include data of the signal received from the external electronic device. According to an embodiment, the electronic device 101 may identify information on the external electronic device 102, based on the decoding result of the data field 840.

Figure 9:
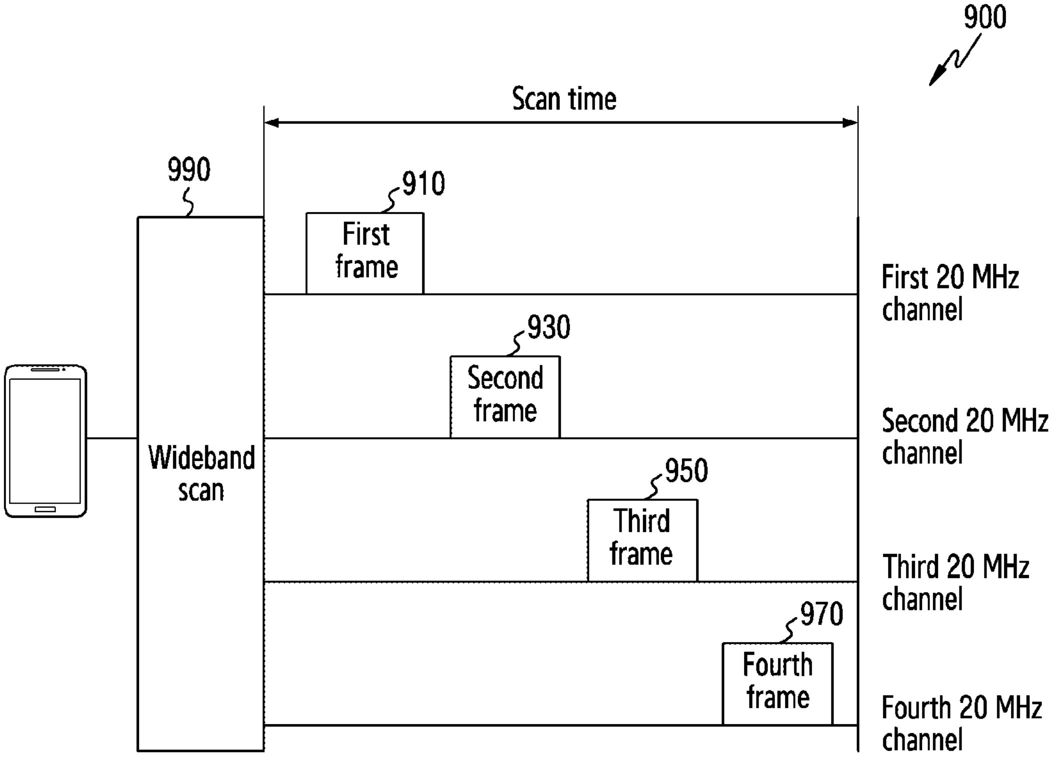
FIG. 9 is a diagram illustrating an example operation of the electronic device for searching for an external electronic device, based on a decoding result of at least a part of a signal according to various embodiments.

FIG. 9 is a diagram illustrating an example 900 operation of the electronic device for searching for an external electronic device, based on a decoding result of at least a part of a signal according to various embodiments. The electronic device of FIG. 9 illustrates the electronic device 101 of FIG. 1. The external electronic device of FIG. 9 illustrates the electronic device 102 of FIG. 1.

Referring to FIG. 9, according to an embodiment, the electronic device 101 may perform wideband scanning 990 on at least two channels for which channel bonding has been performed. According to an embodiment, the electronic device 101 may perform wideband scanning 990 on at least two channels (e.g., a first 20 MHz channel, a second 20 MHz channel, a third 20 MHz channel, and a fourth 20 MHz channel) during a scan time. According to an embodiment, a channel may have a bandwidth of 20 MHz or 40 MHz. According to an embodiment, the electronic device 101 may detect a frame or one of frames (e.g., a first frame 910, a second frame 930, a third frame 950, and a fourth frame 970) by performing wideband scanning 990 on at least two channels. According to an embodiment, the frames are received from the corresponding external electronic devices 102. According to an embodiment, the external electronic devices 102 correspond to respective channels. According to an embodiment, the electronic device 101 may receive the frames of the respective external electronic devices 102 on the channels corresponding to the respective external electronic devices 102. For example, the electronic device 101 may receive the first frame 910 of external electronic device 1 102 on the first 20 MHz channel corresponding to external electronic device 1 102. For example, the electronic device 101 may receive the second frame 930 of external electronic device 2 102 on the second 20 MHz channel corresponding to external electronic device 2 102. For example, the electronic device 101 may receive the third frame 950 of external electronic device 3 102 on the third 20 MHz channel corresponding to external electronic device 3 102. For example, the electronic device 101 may receive the fourth frame 970 of external electronic device 4 102 on the fourth 20 MHz channel corresponding to external electronic device 4 102. According to an embodiment, the frames are management frames and may include at least one of a data frame, a control frame, and a beacon frame.

According to an embodiment, if a frame is detected, the electronic device 101 may decode at least a part of the frame. For example, if the electronic device 101 detects the first frame 910 during wideband scanning 990, at least a part of the first frame 910 may be decoded. According to an embodiment, the electronic device 101 may identify at least one of a transmission rate or a length of the first frame 910, based on a decoding result of at least a part of the first frame 910.

According to an embodiment, the electronic device 101 may compare the transmission rate of the first frame 910 with a reference value of a transmission rate of a designated frame so as to predict that the first frame 910 is not the designated frame. According to an embodiment, the electronic device 101 may compare the length of the first frame 910 with a reference value of a length of the designated frame so as to predict that the first frame 910 is not the designated frame. According to an embodiment, the reference value of the transmission rate of the designated frame and the reference value of the length of the designated frame may be values pre-stored in the electronic device 101.

According to an embodiment, if it is predicted that the first frame 910 is not the designated frame, the electronic device 101 may exclude the first channel, in which the first frame 910 has been detected, from among channels for signal detection during a period in which the first frame 910 is transmitted.

Figure 10:
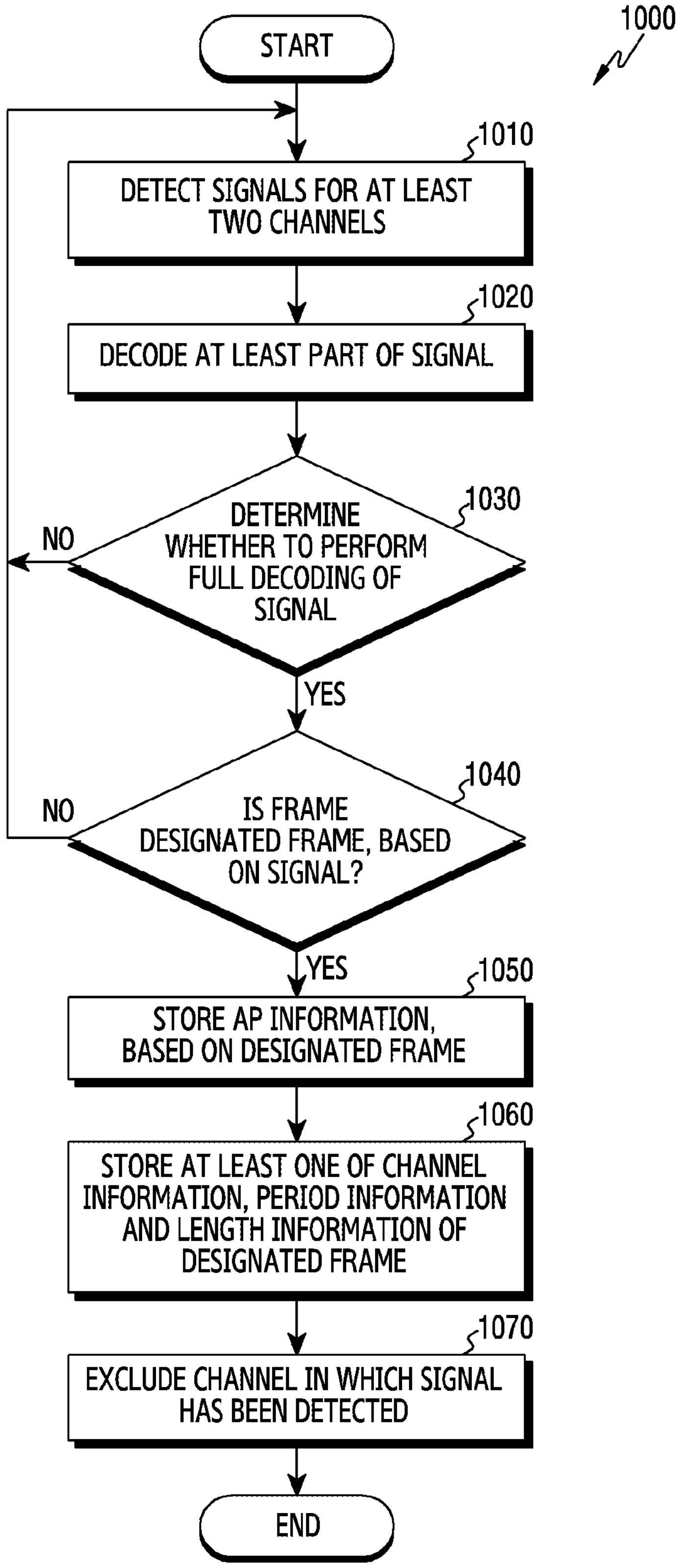
FIG. 10 is a flowchart illustrating an example operation of the electronic device for searching for an external electronic device, based on period information of a signal according to various embodiments.

FIG. 10 is a flowchart 1000 illustrating an example operation of the electronic device for searching for an external electronic device, based on period information of a signal according to various embodiments. The electronic device of FIG. 10 illustrates the electronic device 101 of FIG. 1. The external electronic device of FIG. 10 illustrates the electronic device 102 of FIG. 1.

Referring to FIG. 10, in operation 1010, according to an embodiment, the electronic device 101 may detect signals of at least two channels when performing wideband scanning. According to an embodiment, the electronic device 101 may concurrently detect signals for at least two channels during at least a partial scan time. According to an embodiment, each of at least two channels may have a designated bandwidth (e.g., 20 MHz). According to an embodiment, the electronic device 101 may detect a signal transmitted from the external electronic device 102. According to an embodiment, the electronic device 101 may receive signals periodically transmitted from the external electronic device 102. According to an embodiment, the external electronic device 102 is a device that connects the electronic device 101 and an external server, and may be referred to as an access point (AP)", a "wireless point", a Wi-Fi router" or other terms having equivalent technical meaning. According to an embodiment, a signal may include a management frame, a control frame, and a data frame. According to an embodiment, a signal may include a beacon frame as a management frame. According to an embodiment, the electronic device 101 may perform a wireless connection to the external electronic device 102 by decoding a signal received from the external electronic device 102.

In operation 1020, according to an embodiment, the electronic device 101 may decode at least a part of the detected signal. According to an embodiment, the electronic device 101 may identify information on a frame of the detected signal by decoding at least a part of the signal. According to an embodiment, information of the detected frame may include at least one of a frame transmission rate or a frame length. According to an embodiment, a transmission rate of the detected frame may correspond to a transmission rate of a designated frame. According to an embodiment, a length of the detected frame may correspond to a length of the designated frame. According to an embodiment, at least a part of the signal may include a physical layer header (PHY).

In operation 1030, according to an embodiment, the electronic device 101 may determine whether to perform full decoding of the signal. According to an embodiment, the electronic device 101 may determine whether to perform full decoding of the signal, based on the decoding result of at least a part of the signal. According to an embodiment, the electronic device 101 may predict a frame type of the detected signal, based on information included in at least a part of the signal. According to an embodiment, the electronic device 101 may predict a frame type of the detected signal by comparing the transmission rate of the detected frame with a reference value of a transmission rate of the designated frame. According to an embodiment, the electronic device 101 may predict a frame type of the detected signal by comparing the length of the detected frame with a reference value of a length of the designated frame. According to an embodiment, the reference value of the transmission rate and the reference value of the frame length may be values pre-stored in the electronic device 101.

According to an embodiment, the electronic device 101 may determine whether to perform full decoding of the signal, according to the predicted frame type. According to an embodiment, if it is predicted that the frame type is the designated frame, the electronic device 101 may perform full decoding of the signal. According to an embodiment, if it is predicted that the frame type is not the designated frame, the electronic device 101 may return to operation 1010 and detect signals for at least two channels.

In operation 1040, according to an embodiment, the electronic device 101 may identify, based on the signal, whether the signal frame is the designated frame. According to an embodiment, the electronic device 101 may identify whether the signal frame is the designated frame, based on the decoding result of the signal. According to an embodiment, the electronic device 101 may identify whether the detected frame is the designated frame, based on a full decoding result of the signal.

According to an embodiment, if the detected frame is identified not to be the designated frame (No in operation 1040), the electronic device 101 may return to operation 1010 and detect signals for at least two channels. According to an embodiment, if the detected frame is identified not to be the designated frame, the electronic device 101 may exclude the channel, in which the frame other than the designated frame has been detected, from a list of channels for signal detection. According to an embodiment, the electronic device 101 may detect signals for at least two channels among channels remaining after excluding the channel in which the frame identified to be a frame other than the designated frame has been detected.

According to an embodiment, the electronic device 101 may identify whether a scan time has been exceeded. According to an embodiment, if the scan time is not exceeded, the electronic device 101 may detect signals for at least two channels among channels remaining after excluding the channel in which the frame identified to be a frame other than the designated frame has been detected. According to an embodiment, the electronic device 101 may terminate scanning of channels if the scan time has been exceeded.

In operation 1050, according to an embodiment, if the detected frame is identified to be the designated frame (Yes in operation 1040), the electronic device 101 may store AP information, based on the detected frame.

According to an embodiment, if the detected frame is identified to be the designated frame, the electronic device 101 may store information of the external electronic device 102, based on the detected frame. According to an embodiment, the electronic device 101 may store information of the external electronic device 102, based on an identification result of the detected frame. According to an embodiment, the electronic device 101 may add the information of the external electronic device 102, which is included in the detected frame, to a search result of the external electronic device 102.

In operation 1060, according to an embodiment, the electronic device 101 may store at least one of channel information, period information of the designated frame, or length information of the designated frame. According to an embodiment, the channel information may include number information of a channel in which a frame identified to be the designated frame is detected. According to an embodiment, the period information of the designated frame may include period information of the frame identified to be the designated frame. According to an embodiment, the length information of the designated frame may include period information of the frame identified to be the designated frame.

According to an embodiment, the electronic device 101 may calculate a next reception time point of the frame identified to be the designated frame. According to an embodiment, based on at least one of channel information or period information or length information of the frame identified to be the designated frame, the electronic device 101 may calculate the next reception time point of the frame.

In operation 1070, the electronic device 101 may exclude the channel, in which the designated frame has been detected, from among channels in which signals are to be detected in a next period. According to an embodiment, at the next reception time point of the frame identified to be the designated frame, the electronic device 101 may exclude the channel, in which the frame has been detected, from the list of channels in which signals are to be detected. According to an embodiment, at the next reception time point of the frame identified to be the designated frame, the electronic device 101 may detect signals for at least two channels among channels remaining after excluding the channel in which the frame has been detected.

Although operation 1070 is illustrated as being performed after operation 1060 in FIG. 10, embodiments of the disclosure are not limited thereto. According to an embodiment, the electronic device 101 may perform operation 1060 after performing operation 1070, or may perform operations 1060 and 1070 in parallel.

Although not illustrated in FIG. 10, according to an embodiment, if information of at least two external electronic devices 102 is stored, the electronic device 101 may select, based on the stored information, the external electronic device 102 to perform wireless connection to the electronic device 101. According to an embodiment, the electronic device 101 may select the external electronic device 102 to perform wireless connection to the electronic device 101, by comparing the stored information. According to an embodiment, the electronic device 101 may perform wireless connection to the selected external electronic device 102. According to an embodiment, the electronic device 101 may be wirelessly connected to the identified external electronic device 102 using a designated radio access technology (RAT). According to an embodiment, the designated RAT may include Wi-Fi, Bluetooth, ZigBee, or a combination thereof.

Although not illustrated in FIG. 10, according to an embodiment, the electronic device 101 may identify whether a configured scan time has been exceeded. According to an embodiment, as a parallel operation to the operations of FIG. 10, the electronic device 101 may identify whether the configured scan time has been exceeded. According to an embodiment, the electronic device 101 may perform the operations of FIG. 10 if the scan time is not exceeded. According to an embodiment, the electronic device 101 may terminate scanning of channels if the scan time has been exceeded.

Figure 11:
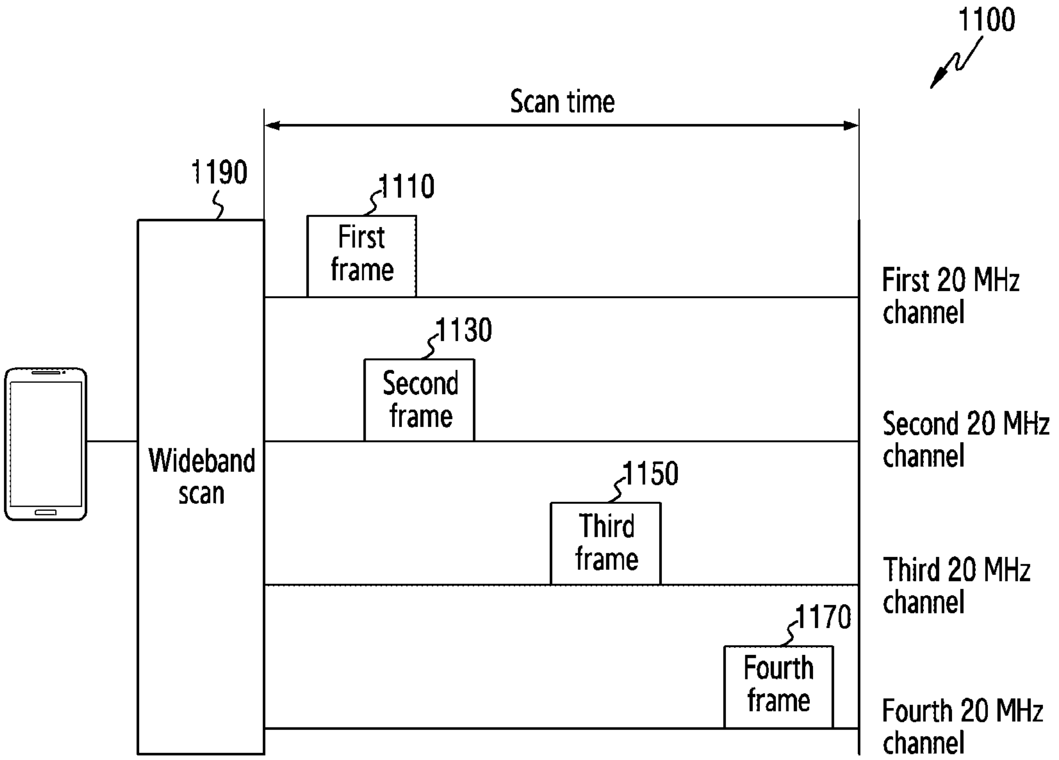
FIG. 11 is a diagram illustrating an example operation of the electronic device for searching for an external electronic device, based on period information of a signal according to various embodiments.

FIG. 11 is a diagram illustrating an example 1100 operation flow of the electronic device for searching for an external electronic device, based on period information of a signal according to various embodiments. The electronic device of FIG. 11 illustrates the electronic device 101 of FIG. 1. The external electronic device of FIG. 11 illustrates the electronic device 102 of FIG. 1.

According to an embodiment, FIG. 11 illustrates a situation in which at least two signals are concurrently transmitted to the electronic device 101 on multiple channels during at least a part of a scan time.

Referring to FIG. 11, according to an embodiment, the electronic device 101 may perform wideband scanning 1190 on at least two channels for which channel bonding has been performed. According to an embodiment, the electronic device 101 may perform wideband scanning 1190 on at least two channels (e.g., a first 20 MHz channel, a second 20 MHz channel, a third 20 MHz channel, and a fourth 20 MHz channel) during a scan time. According to an embodiment, a channel may have a bandwidth of 20 MHz or 40 MHz. According to an embodiment, the electronic device 101 may detect one of frames (e.g., a first frame 1110, a second frame 1130, a third frame 1150, and a fourth frame 1170) by performing wideband scanning 1190 on at least two channels. According to an embodiment, the frames are received from the corresponding external electronic devices 102. According to an embodiment, the external electronic devices 102 correspond to respective channels. According to an embodiment, the electronic device 101 may receive the frames of the respective external electronic devices 102 on the channels corresponding to the respective external electronic devices 102. According to an embodiment, the electronic device 101 may receive the first frame 1110 of external electronic device 1 102 on the first 20 MHz channel corresponding to external electronic device 1 102. According to an embodiment, the electronic device 101 may receive the second frame 1130 of external electronic device 2 102 on the second 20 MHz channel corresponding to external electronic device 2 102. According to an embodiment, the electronic device 101 may receive the third frame 1150 of external electronic device 3 102 on the third 20 MHz channel corresponding to external electronic device 3 102. According to an embodiment, the electronic device 101 may receive the fourth frame 1170 of external electronic device 4 102 on the fourth 20 MHz channel corresponding to external electronic device 4 102. According to an embodiment, the frames are management frames and may include at least one of a data frame, a control frame, and a beacon frame.

According to an embodiment, if a frame is detected, the electronic device 101 may decode at least a part of the frame. According to an embodiment, if the electronic device 101 detects the first frame 1110 during wideband scanning 1190, at least a part of the first frame 1110 may be decoded. According to an embodiment, the electronic device 101 may identify at least one of a transmission rate or a length of the first frame 1110, based on a decoding result of at least a part of the first frame 1110.

According to an embodiment, the electronic device 101 may compare the transmission rate of the first frame 1110 with a reference value of a transmission rate of the designated frame so as to predict that the first frame 1110 is not the designated frame. According to an embodiment, the electronic device 101 may compare the length of the first frame 1110 with a reference value of a length of the designated frame so as to predict that the first frame 1110 is not the designated frame. According to an embodiment, the reference value of the transmission rate of the designated frame and the reference value of the length of the designated frame may be values pre-stored in the electronic device 101. According to an embodiment, if the frame 1110 is predicted not to be the designated frame, the electronic device 101 may calculate a time period, in which the frame 1110 is transmitted on the corresponding channel, based on the transmission rate of the frame 1110 and the length of the frame 1110. According to an embodiment, the electronic device 101 may perform signal search in channels except for the channel on which the frame 1110 is transmitted, during the time period in which the frame 1110 is transmitted.

According to an embodiment, if the first frame 1110 is predicted to be the designated frame, the electronic device 101 may perform full decoding of the first frame 1110. According to an embodiment, the electronic device 101 may identify whether the first frame 1110 is the designated frame, according to a result of performing full decoding. According to an embodiment, if the first frame 1110 is identified to be the designated frame, the electronic device 101 may store information of the external electronic device 102, based on the first frame 1110. According to an embodiment, based on the full decoding result of the first frame 1110, the electronic device 101 may store at least one of channel information of the first frame 1110, period information of the first frame 1110, and length information of the first frame 1110. According to an embodiment, the electronic device 101 may calculate a next reception time point of the first frame 1110, based on at least one of the channel information, the period information, and the length information of the first frame 1110. According to an embodiment, the electronic device 101 may exclude the channel of the first frame 1110 from the list of channels, in which signals are to be detected, at the next reception time point of the first frame 1110. According to an embodiment, the electronic device 101 may detect signals for at least two channels among channels remaining after excluding the channel of the first frame 1110, at the next reception time point of the first frame 1110.

Figure 12:
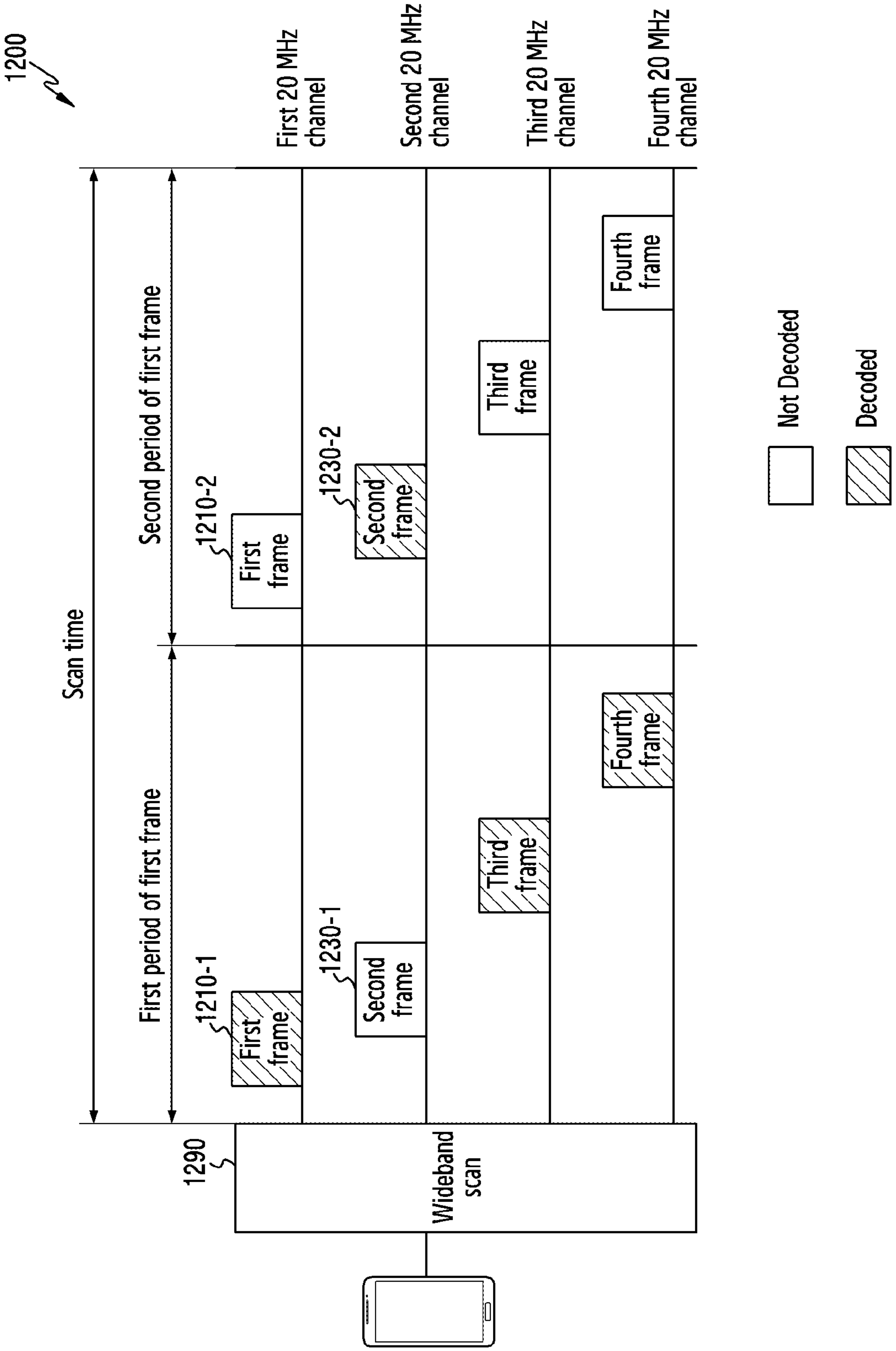
FIG. 12 is a diagram illustrating an example operation of the electronic device for searching for an external electronic device, based on period information of a signal according to various embodiments.

FIG. 12 is a diagram illustrating an example 1200 operation flow of the electronic device for searching for an external electronic device, based on period information of a signal according to various embodiments. The electronic device of FIG. 12 illustrates the electronic device 101 of FIG. 1. The external electronic device of FIG. 12 illustrates the electronic device 102 of FIG. 2.

Referring to FIG. 12, according to an embodiment, the electronic device 101 may perform wideband scanning 1290 on at least two channels (e.g., a first 20 MHz channel, a second 20 MHz channel, a third 20 MHz channel, and a fourth 20 MHz channel), for which channel bonding has been performed, during a scan time. According to an embodiment, a scan time may include a first period of a first frame 1210-1 and a second period of the first frame 1210-2. According to an embodiment, in the first period of the first frame, the first frame 1210-1 and a second frame 1230-1 may be concurrently transmitted to the electronic device 101 at least one time point. According to an embodiment, the electronic device 101 may decode at least a part of the first frame 1210-1 that is received first. According to an embodiment, the electronic device 101 may identify at least one of a transmission rate or a length of the first frame 1210-1, based on a decoding result of at least a part of the first frame 1210-1.

According to an embodiment, the electronic device 101 may predict a type of the first frame 1210-1, based on the transmission rate and length of the first frame 1210-1.

According to an embodiment, the electronic device 101 may predict the type of the first frame 1210-1 by comparing the transmission rate of the first frame 1210-1 with a reference value of a transmission rate of a designated frame. According to an embodiment, the electronic device 101 may predict whether the first frame 1210-1 is a type of the designated frame, by comparing the length of the first frame 1210-1 with a reference value of a length of the designated frame. According to an embodiment, if the first frame 1210-1 is predicted to be the designated frame, the electronic device 101 may perform full decoding of the first frame 1210-1. According to an embodiment, the electronic device 101 may identify whether the first frame 1210-1 is the designated frame, according to a result of performing full decoding. According to an embodiment, if the first frame 1210-1 is identified to be the designated frame, the electronic device 101 may store information of the external electronic device 102, based on the first frame 1210-1. According to an embodiment, based on the full decoding result of the first frame 1210-1, the electronic device 101 may store at least one of channel information of the first frame 1210-1, period information of the first frame 1210-1, and length information of the first frame 1210-1. According to an embodiment, the electronic device 101 may calculate a next reception time point of the second period of the first frame 1210-1, based on at least one of the channel information, period information, and length information of the first frame 1210-1. According to an embodiment, the electronic device 101 may exclude a channel of the first frame 1210-1 from a list of channels, in which signals are to be detected, in the second period of the first frame 1210-1. According to an embodiment, the electronic device 101 may detect signals for at least two channels among channels remaining after excluding the channel of the first frame 1210-1, in the second period of the first frame 1210-1.

According to an embodiment, the electronic device 101 may predict the second period of the first frame, based on at least one of the stored channel information of the first frame 1210-1, period information of the first frame 1210-1, and length information of the first frame 1210-1.

According to an embodiment, in the predicted second period of the first frame, the first frame 1210-2 and a second frame 1230-2 may be concurrently transmitted to the electronic device 101 at least one time point. According to an embodiment, the electronic device 101 may wait for frame reception in at least two channels among channels remaining after excluding a channel of the first frame 1210-2, in the predicted second period of the first frame 1210-2. According to an embodiment, the electronic device 101 may detect the second frame 1230-2 in a second channel among channels remaining after excluding the channel of the first frame 1210-2, in the predicted second period of the first frame 1210-2. According to an embodiment, the electronic device 101 may decode at least a part of the second frame 1230-2.

According to an embodiment, the electronic device 101 may identify at least one of a transmission rate or a length of the second frame 1230-2, based on a decoding result of at least a part of the second frame 1230-2.

According to an embodiment, the electronic device 101 may predict a type of the second frame 1230-2, based on the transmission rate and length of the second frame 1230-2. According to an embodiment, if the second frame 1230-2 is predicted to be the designated frame, the electronic device 101 may perform full decoding of the second frame 1230-2. According to an embodiment, the electronic device 101 may identify whether the second frame 1230-2 is the designated frame, according to a result of performing full decoding. According to an embodiment, if the second frame 1230-2 is identified to be the designated frame, the electronic device 101 may store information of the external electronic device 102, based on the second frame 1230-2. According to an embodiment, when frames are concurrently transmitted in two or more channels by receiving the frames from among channels remaining after excluding the channel of the first frame 1210-2 in the second period of the first frame 1210-2, the electronic device 101 may improve a frame reception success rate of the electronic device 101.

An electronic device according to an example embodiment of the disclosure as described above may include: a communication circuit, and a processor operatively connected to the communication circuit, wherein the processor is configured to: receive signals for at least two channels during a designated search time, identify whether a frame is a designated frame based on information included in at least a part of the signal, and store information of an access point (AP) based on a signal identified to have the designated frame.

According to an example embodiment, in order to identify the designated frame, based on the information included in the at least a part of the signal, the processor may be configured to: decode the at least a part of the signal, and compare a decoding result of the at least a part of the signal with a reference value.

According to an example embodiment, the processor may be further configured to: determine whether to perform full decoding of the signal based on the decoding result of the at least a part of the signal.

According to an example embodiment, the processor may be further configured to identify whether the detected signal has the designated frame based on a result of performing full decoding of the signal.

According to an example embodiment, the information included in the at least a part of the signal may include at least one of transmission rate information of the signal or length information of the signal.

According to an example embodiment, the processor may be further configured to, based on the detected signal being identified to not have the designated frame, detect signals in channels other than a channel of the detected signal from among the at least two channels.

According to an example embodiment, the processor may be further configured to identify a transmission period of the detected signal based on the detected signal.

According to an example embodiment, the processor may be further configured to, based on the transmission period of the detected signal, detect signals in channels other than a channel of the detected signal from among the at least two channels, while a next signal of the detected signal is being transmitted.

According to an example embodiment, the at least a part of the signal may include a frame header of the signal.

According to an example embodiment, the frame header of the signal may include at least one of a legacy preamble, a high throughput (HT) preamble, a very high throughput (VHT) preamble, a high efficiency (HE) preamble, or a combination thereof.

A method of operating an electronic device according to an example embodiment as described above may include: receiving signals of at least two channels during a designated search time, identifying whether a frame is a designated frame based on information included in at least a part of the signal, and storing information of an access point (AP) based on a signal identified to have the designated frame.

According to an example embodiment, the identifying of the designated frame based on the information included in the at least a part of the signal may include decoding the at least a part of the signal, and comparing a decoding result of the at least a part of the signal with a reference value.

According to an example embodiment, the method may further include determining whether to perform full decoding of the signal based on the decoding result of the at least a part of the signal.

According to an example embodiment, the method may further include identifying whether the detected signal has the designated frame based on a result of performing full decoding of the signal.

According to an example embodiment, the information included in the at least a part of the signal may include at least one of transmission rate information of the signal or length information of the signal.

According to an example embodiment, the method may further include, based on the detected signal being identified to not have the designated frame, detecting signals in channels other than a channel of the detected signal from among the at least two channels.

According to an example embodiment, the method may further include identifying a transmission period of the detected signal based on the detected signal.

According to an example embodiment, the method may further include, based on the transmission period of the detected signal, detecting signals in channels other than a channel of the detected signal from among the at least two channels, while a next signal of the detected signal is being transmitted.

According to an example embodiment, the at least a part of the signal may include a frame header of the signal.

According to an example embodiment, the frame header of the signal may include at least one of a legacy preamble, a high throughput (HT) preamble, a very high throughput (VHT) preamble, a high efficiency (HE) preamble, or a combination thereof.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the “non-transitory” storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

communication circuitry; and at least one processor including processing circuitry, memory storing instructions that, when executed by the at least one processor individually or collectively, cause the electronic device to:

receive, via the communication circuitry, an initial portion of a first frame on a first channel selected among at least two channels during a first period within a designated search time;

decode the initial portion of the first frame and identify whether the first frame is a designated frame based on a comparison between a reference value and at least one of transmission rate information or length information obtained from the initial portion of the first frame;

if the first frame is identified as a designated frame based on decoding information obtained from the initial portion of the first frame, receive a remaining portion of the first frame on the first channel during a second period within the designated search time;

store, in the memory, information of an access point (AP) derived from the first frame including the initial portion and the remaining portion, wherein the AP information includes at least one of channel information of the first frame, period information of the first frame, or length information of the first frame;

calculate, based on at least one of the channel information, the period information, or the length information of the first frame, a next reception time of the first frame; and at the calculated next reception time of the first frame, exclude the first channel from a list of channels in which signals are to be detected and detect signals for at least two channels among channels remaining in the list after excluding the first channel, wherein the designated search time is set differently depending on whether an application related to a location-based service or an application that requires a Wi-Fi connection is running on the electronic device.

2. The device of claim 1, wherein the instructions that, when executed by the at least one processor individually or collectively, cause the electronic device to determine whether to perform full decoding of the first frame based on the decoding result of the portion of the first frame.

3. The device of claim 1, wherein the instructions that, when executed by the at least one processor individually or collectively, cause the electronic device to identify whether the first frame is the designated frame based on a result of performing full decoding of the first frame.

4. The device of claim 1, wherein the portion of the first frame comprises a frame header of the first frame.

5. The device of claim 4, wherein the frame header of the first frame comprises at least one of a legacy preamble, a high throughput (HT) preamble, a very high throughput (VHT) preamble, a high efficiency (HE) preamble, or a combination thereof.

6. A method of operating an electronic device, the method comprising:

receiving an initial portion of a first frame on a first channel selected among at least two channels during a first period within a designated search time;

decoding the initial portion of the first frame and identify whether the first frame is a designated frame based on a comparison between a reference value and at least one of transmission rate information or length information obtained from the initial portion of the first frame;

if the first frame is identified as a designated frame based on decoding information obtained from the initial portion of the first frame, receiving a remaining portion of the first frame on the first channel during a second period within the designated search time;

storing, in the memory, information of an access point (AP) derived from the first frame including the initial portion and the remaining portion, wherein the AP information includes at least one of channel information of the first frame, period information of the first frame, or length information of the first frame; and calculating, based on at least one of the channel information, the period information, or the length information of the first frame, a next reception time of the first frame; and at the calculated next reception time of the first frame, excluding the first channel from a list of channels in which signals are to be detected and detecting signals for at least two channels among channels remaining in the list after excluding the first channel, wherein the designated search time is set differently depending on whether an application related to a location-based service or an application that requires a Wi-Fi connection is running on the electronic device.

7. The method of claim 6, further comprising determining whether to perform full decoding of the first frame based on the decoding result of the portion of the first frame.

8. The method of claim 6, further comprising identifying whether the first frame is the designated frame based on a result of performing full decoding of the first frame.

* * * * *